US009742767B1

(12) United States Patent
Li et al.

(10) Patent No.: US 9,742,767 B1
(45) Date of Patent: Aug. 22, 2017

(54) SYSTEMS, METHODS, AND MEDIA FOR AUTHENTICATING MULTIPLE DEVICES

(71) Applicant: Google Inc., Mountain View, CA (US)

(72) Inventors: Jun Li, Zurich (CH); Alexander Taboriskiy, Zurich (CH)

(73) Assignee: Google Inc., Mountain View, CA (US)

( * ) Notice: Subject to any disclaimer, the term of this patent is extended or adjusted under 35 U.S.C. 154(b) by 6 days.

(21) Appl. No.: 14/496,811

(22) Filed: Sep. 25, 2014

(51) Int. Cl.
- *G06F 7/04* (2006.01)
- *H04L 29/06* (2006.01)
- *G06F 21/44* (2013.01)
- *G06F 21/31* (2013.01)

(52) U.S. Cl.
CPC .......... *H04L 63/0884* (2013.01); *G06F 21/31* (2013.01); *G06F 21/44* (2013.01)

(58) Field of Classification Search
CPC .................................................. H04L 63/0884
USPC ............................................................ 726/9
See application file for complete search history.

(56) References Cited

U.S. PATENT DOCUMENTS

| 2008/0101276 A1* | 5/2008 | Huang | H04L 63/102 370/328 |
| 2014/0173695 A1* | 6/2014 | Valdivia | G06F 21/36 726/4 |
| 2016/0134488 A1* | 5/2016 | Straub | G06F 21/44 726/4 |

FOREIGN PATENT DOCUMENTS

DE    WO 2005015882 A1 *  2/2005   ............ H04L 29/06

* cited by examiner

*Primary Examiner* — Peter Shaw
(74) *Attorney, Agent, or Firm* — Byrne Poh LLP

(57) ABSTRACT

Systems, methods, and media for authentication are provided. In accordance with some implementations, the system comprises: a hardware processor that is programmed to: receive, from a device, a message relating to an authentication status of a user account associated with the device; transmit an authentication request to the device that is transmitted to an authentication server; receive, from the device, a response to the authentication request that includes authentication data relating to a session corresponding to the user account on the authentication server; cause an interface to be presented that requests authorization to authenticate the device with the authentication server using the user account; and transmit the authentication data to the device that causes the device to retrieve a corresponding authentication token from the authentication server, wherein the corresponding authentication token authenticates the user account on the device.

16 Claims, 5 Drawing Sheets

US 9,742,767 B1

SYSTEMS, METHODS, AND MEDIA FOR AUTHENTICATING MULTIPLE DEVICES

TECHNICAL FIELD

The disclosed subject matter relates to systems, methods, and media for authenticating multiple devices.

BACKGROUND

Many users want to watch media content associated with a video hosting or sharing services on media devices, such as their televisions. It is often preferable or necessary to log in to a user account associated with the service to access and view media content. However, it is generally difficult to provide the user account information, such as a username and a password, in these types of media devices. For example, using input devices like remote controls to sign in to the user account from the media device can be time consuming and/or cumbersome.

Accordingly, it is desirable to provide new systems, methods, and media for authenticating multiple devices.

SUMMARY

Systems, methods, and media for authentication are provided. In accordance with some implementations of the disclosed subject matter, a system for authentication is provided, the system comprising: a hardware processor that is programmed to: associate with a device; receive, from the device, a status message relating to an authentication status of a user account associated with the device; cause a first interface to be presented that initiates authentication of the device; transmit an authentication request to the device that is transmitted to an authentication server in response to receiving the authentication request using the first interface; receive, from the device, a response to the authentication request that includes authentication data relating to a session corresponding to the user account on the authentication server; cause a second interface to be presented that requests authorization to authenticate the device with the authentication server using the user account; and transmit the authentication data to the device that causes the device to retrieve a corresponding authentication token from the authentication server, wherein the corresponding authentication token authenticates the user account on the device.

In accordance with some implementations of the disclosed subject matter, a method for authentication is provided, the method comprising: associating with a device; receiving, from the device, a status message relating to an authentication status of a user account associated with the device; causing a first interface to be presented that initiates authentication of the device; transmitting an authentication request to the device that is transmitted to an authentication server in response to receiving the authentication request using the first interface; receiving, from the device, a response to the authentication request that includes authentication data relating to a session corresponding to the user account on the authentication server; causing a second interface to be presented that requests authorization to authenticate the device with the authentication server using the user account; and transmitting the authentication data to the device that causes the device to retrieve a corresponding authentication token from the authentication server, wherein the corresponding authentication token authenticates the user account on the device.

In accordance with some implementations of the disclosed subject matter, non-transitory computer-readable media containing computer executable instructions that, when executed by a processor, cause the processor to perform a method for authentication are provided, the method comprising: associating with a device; receiving, from the device, a status message relating to an authentication status of a user account associated with the device; causing a first interface to be presented that initiates authentication of the device; transmitting an authentication request to the device that is transmitted to an authentication server in response to receiving the authentication request using the first interface; receiving, from the device, a response to the authentication request that includes authentication data relating to a session corresponding to the user account on the authentication server; causing a second interface to be presented that requests authorization to authenticate the device with the authentication server using the user account; and transmitting the authentication data to the device that causes the device to retrieve a corresponding authentication token from the authentication server, wherein the corresponding authentication token authenticates the user account on the device.

In accordance with some implementations of the disclosed subject matter, a system for authentication is provided, the system comprising: means for associating with a device; means for receiving, from the device, a status message relating to an authentication status of a user account associated with the device; means for causing a first interface to be presented that initiates authentication of the device; means for transmitting an authentication request to the device that is transmitted to an authentication server in response to receiving the authentication request using the first interface; means for receiving, from the device, a response to the authentication request that includes authentication data relating to a session corresponding to the user account on the authentication server; means for causing a second interface to be presented that requests authorization to authenticate the device with the authentication server using the user account; and means for transmitting the authentication data to the device that causes the device to retrieve a corresponding authentication token from the authentication server, wherein the corresponding authentication token authenticates the user account on the device.

In some implementations, the hardware processor is on a mobile device, and the associated device is a television.

In some implementations, the system further comprises: means for identifying a plurality of user accounts available for authentication on the device; and means for requesting a selection of one of the plurality of user accounts to be used for authentication on the device.

In some implementations, the second interface indicates the plurality of user accounts available for authentication on the device, and the second interface requests the selection of one of the plurality of user accounts to be used for authentication on the device.

In some implementations, the system further comprises means for transmitting information that identifies the one of the plurality of user accounts to be used for authentication on the device.

In some implementations, the system further comprises: means for receiving, from the device, a second response to the authentication request that indicates that a session associated with the user account was not identified by the authentication server; in response to receiving the second response, means for causing a third interface to be presented that requests user credentials associated with the user account; and means for transmitting the user credentials to the authentication server.

In some implementations, the system further comprises: means for identifying a service associated with the user account based on the status message received from the device; and means for causing an identification of the service to be presented in the first interface.

In some implementations the response to the authentication request further includes a Uniform Resource Locator (URL) associated with the user account.

In accordance with some implementations of the disclosed subject matter, a system for authentication is provided, the system comprising: a hardware processor that is programmed to: transmit, to an associated device via a communication channel, a status message relating to an authentication status; receive, from the device via the communication channel, an authentication request for authenticating with a user account that is currently used for authentication of the device; in response to receiving the authentication request, transmit the authentication request to an authentication server; receive, from the authentication server, a response to the authentication request that includes authentication data relating to a session corresponding to the user account and the device on the authentication server; transmit the authentication data to the device via the communication channel; receive, from the device via the communication channel, a message including the authentication data; in response to receiving the message, request an authentication token from the authentication server, wherein the authentication token authenticates the same user account that is authenticated on the device; and authenticate the same user account.

In accordance with some implementations of the disclosed subject matter, a method for authentication is provided, the method comprising: transmitting, to an associated device via a communication channel, a status message relating to an authentication status; receiving, from the device via the communication channel, an authentication request for authenticating with a user account that is currently used for authentication of the device; in response to receiving the authentication request, transmitting the authentication request to an authentication server; receiving, from the authentication server, a response to the authentication request that includes authentication data relating to a session corresponding to the user account and the device on the authentication server; transmitting the authentication data to the device via the communication channel; receiving, from the device via the communication channel, a message including the authentication data; in response to receiving the message, requesting an authentication token from the authentication server, wherein the authentication token authenticates the same user account that is authenticated on the device; and authenticating the same user account.

In accordance with some implementations of the disclosed subject matter, non-transitory computer-readable media containing computer executable instructions that, when executed by a processor, cause the processor to perform a method for authentication is provided, the method comprising: transmitting, to an associated device via a communication channel, a status message relating to an authentication status; receiving, from the device via the communication channel, an authentication request for authenticating with a user account that is currently used for authentication of the device; in response to receiving the authentication request, transmitting the authentication request to an authentication server; receiving, from the authentication server, a response to the authentication request that includes authentication data relating to a session corresponding to the user account and the device on the authentication server; transmitting the authentication data to the device via the communication channel; receiving, from the device via the communication channel, a message including the authentication data; in response to receiving the message, requesting an authentication token from the authentication server, wherein the authentication token authenticates the same user account that is authenticated on the device; and authenticating the same user account.

In accordance with some implementations of the disclosed subject matter, a system for authentication is provided, the system comprising: means for transmitting, to an associated device via a communication channel, a status message relating to an authentication status; means for receiving, from the device via the communication channel, an authentication request for authenticating with a user account that is currently used for authentication of the device; in response to receiving the authentication request, means for transmitting the authentication request to an authentication server; means for receiving, from the authentication server, a response to the authentication request that includes authentication data relating to a session corresponding to the user account and the device on the authentication server; means for transmitting the authentication data to the device via the communication channel; means for receiving, from the device via the communication channel, a message including the authentication data; in response to receiving the message, means for requesting an authentication token from the authentication server, wherein the authentication token authenticates the same user account that is authenticated on the device; and means for authenticating the same user account.

In accordance with some implementations of the disclosed subject matter, a system for authentication is provided, the system comprising: a hardware processor that is programmed to: receive, from an associated device via a communication channel, an authentication status message indicating that a user account is not associated with the device; transmit an authentication request to an authentication server via the communication channel with the device; receive, through the communication channel with the device, a response to the authentication request that includes authentication data for an existing session with the user account on the authentication server; permit the device to be authenticated using the received authentication data; and in response to receiving the permission, transmit the authentication data to the device via the communication channel that causes the user account to be authenticated on the device by the authentication server.

In accordance with some implementations of the disclosed subject matter, a method for authentication is provided, the method comprising: receiving, from an associated device via a communication channel, an authentication status message indicating that a user account is not associated with the device; transmitting an authentication request to an authentication server via the communication channel with the device; receiving, through the communication channel with the device, a response to the authentication request that includes authentication data for an existing session with the user account on the authentication server; permitting the device to be authenticated using the received authentication data; and in response to receiving the permission, transmitting the authentication data to the device via the communication channel that causes the user account to be authenticated on the device by the authentication server.

In accordance with some implementations of the disclosed subject matter, non-transitory computer-readable media containing computer executable instructions that, when executed by a processor, cause the processor to perform a method for authentication is provided, the method comprising: receiving, from an associated device via a communication channel, an authentication status message indicating that a user account is not associated with the device; transmitting an authentication request to an authentication server via the communication channel with the device; receiving, through the communication channel with the device, a response to the authentication request that includes authentication data for an existing session with the user account on the authentication server; permitting the device to be authenticated using the received authentication data; and in response to receiving the permission, transmitting the authentication data to the device via the communication channel that causes the user account to be authenticated on the device by the authentication server.

In accordance with some implementations of the disclosed subject matter, a system for authentication is provided, the system comprising: means for receiving, from an associated device via a communication channel, an authentication status message indicating that a user account is not associated with the device; means for transmitting an authentication request to an authentication server via the communication channel with the device; means for receiving, through the communication channel with the device, a response to the authentication request that includes authentication data for an existing session with the user account on the authentication server; means for permitting the device to be authenticated using the received authentication data; and in response to receiving the permission, means for transmitting the authentication data to the device via the communication channel that causes the user account to be authenticated on the device by the authentication server.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
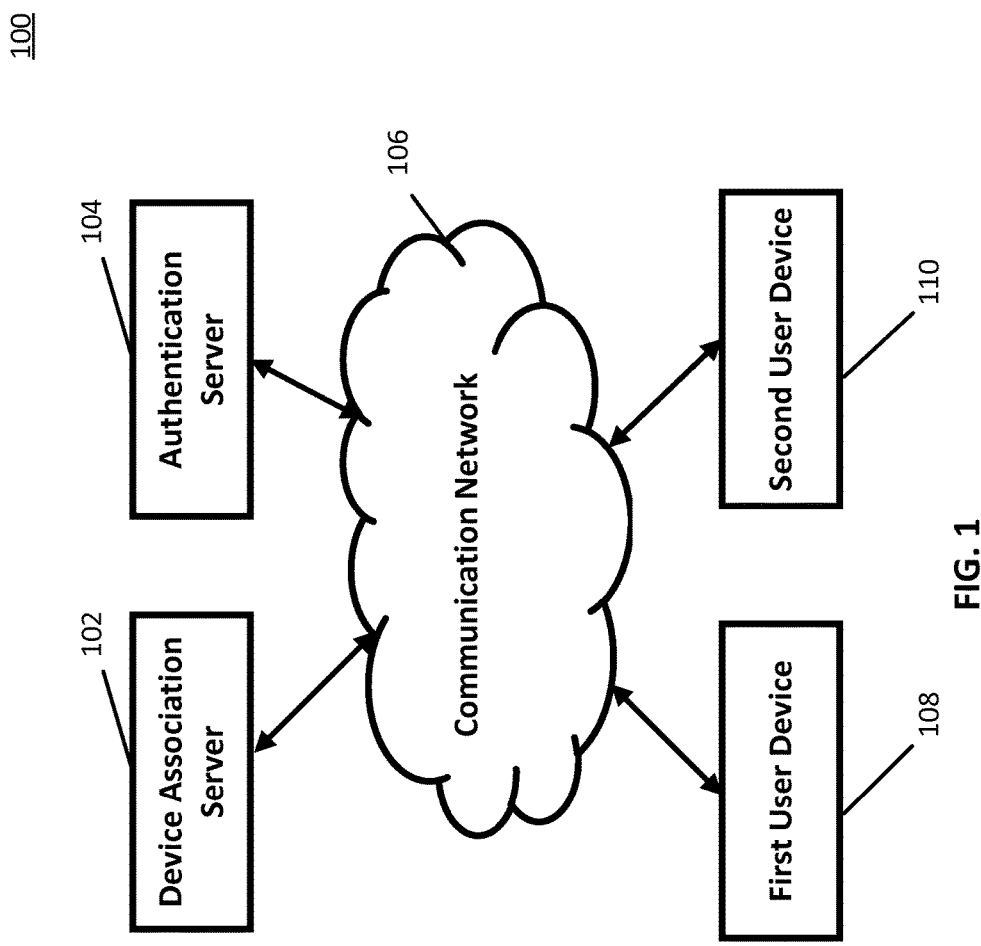
FIG. 1 shows a schematic diagram of an illustrative system suitable for implementation of mechanisms described herein for authenticating a second user device using the same credentials as those used on a first user device in accordance with some implementations of the disclosed subject matter.

In accordance with various implementations, mechanisms (which can include systems, methods, and media) for authentication are provided.

In some implementations, the mechanisms described herein can be implemented on a first user device (e.g., a mobile phone, a tablet computer, a wearable computer, a laptop computer, and/or any other suitable device), a second user device (e.g., a television, a projector, a game console, and/or any other suitable device), and an authorization server. In some implementations, the first user device can be a user device with any input device(s) (e.g., a keyboard, a touchscreen, a mouse, a microphone, and/or any other suitable input device) suitable for entry of user credentials, such as a username and/or password. In some implementations, the second user device can be a user device with no input devices and/or input devices that make entry of user credentials difficult, such as a printer, a household appliance (e.g., a smoke detector, a washer/dryer, and/or any other suitable appliance), and/or any other suitable device.

In some implementations, the second user device can determine that a user account is to be logged in to on the second user device and can transmit a message to the first user device indicating that the user account is to be logged in to using a communication channel established between the two user devices. In some implementations, the first user device can then cause the user account to be logged in to on the second user device using user credentials (e.g., a username, a password, and/or any other suitable user credentials) that have been used to establish a session associated with the same user account and the first user device.

In some implementations, the second user device can transmit, to the first user device, an indication that a user account is to be logged in to on the second user device. The first user device can then transmit an authorization request to the second user device, which can forward the authorization request to the authorization server. In response to receiving the authorization request, the authorization server can identify an existing session associated with the user account and the first user device, and after identifying the existing session, can transmit authentication data (e.g., a sequence of random characters generated by the authorization server, and/or any other suitable authentication data) to the second user device. The second user device can transmit the received authentication data to the first user device, which can request permission from a user to authenticate the second user device using a user account associated with the first user device. In response to receiving permission, the first user device can transmit the authentication data and/or an indication of the received permission to the second user device. In response to receiving the authentication data, the second user device can request an authentication token from the authorization server. That is, using the mechanisms described herein, the user account can be authenticated on the second user device using user account credentials associated with the first user device.

In some implementations, the first user device can identify two or more user accounts that can be authenticated on the second user device. In such implementations, the first user device can determine which of the two or more user accounts is to be used based on input received from a user interface. In some implementations, the first user device can then transmit an indication of the particular user account to be used in addition to permission to authenticate the particular user account on the second user device.

Turning to FIG. 1, an example 100 of hardware for authenticating multiple devices that can be used in accordance with some implementations of the disclosed subject matter is shown. As illustrated, hardware 100 can include a device association server 102, an authentication server 104, a communication network 106, and/or one or more user devices, such as first user device 108 and second user device 110.

Device association server 102 can be any suitable server(s) for establishing a communication channel between first user device 108 and second user device 110. For example, in some implementations, first user device 108 and second user device 110 can each connect to device association server 102, and device association server 102 can transmit messages between first user device 108 and second user device 110, as described below in connection with block 302 of FIG. 3.

Authentication server 104 can be any suitable server(s) for identifying an existing session associated with a user account and first user device 108 and transmitting authentication data corresponding to the identified session. For example, in some implementations, authentication server 104 can receive an authentication request from second user device 110 and can identify the existing session in response to receiving the authentication request. As another example, in some implementations, authentication server 104 can generate authentication data and transmit the generated authentication data to second user device 110, for example, as described below in connection with FIG. 3. As yet another example, in some implementations, authentication server 104 can receive authentication requests that include user credentials (e.g., usernames, passwords, and/or any other suitable user credentials) corresponding to first user device 108 (and/or any other suitable user device) and can establish sessions of a corresponding user account in response to receiving the user credentials.

Communication network 106 can be any suitable combination of one or more wired and/or wireless networks in some implementations. For example, communication network 106 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 108 and/or 110 can be connected by one or more communications links to communication network 106 that can be linked via one or more communications links to device association server 102 and/or authentication server 104. The communications links can be any communications links suitable for communicating data among user devices 108 and/or 110 and device association server 102 and/or authentication server 104 such as network links, dial-up links, wireless links, hard-wired links, any other suitable communications links, or any suitable combination of such links.

First user device 108 can include any one or more user devices suitable for receiving authorization to authenticate second user device 110 using user credentials associated with first user device 108. For example, in some implementations, first user device 108 can include a mobile device (e.g., a smartphone, a mobile phone, a tablet computer, a wearable computer, a laptop computer, and/or any other suitable mobile device) and/or a non-mobile device (e.g., a desktop computer, and/or any other suitable non-mobile device). Second user device 110 can include any one or more user devices suitable for logging into a user account based on user credentials associated with first user device 108. For example, in some implementations, second user device 110 can include a television, a projector, a game console, a stereo, a desktop computer, and/or any other suitable user device.

Although device association server 102 and authentication server 104 are each illustrated as one device, the functions performed by device association server 102 and/or authentication server 104 can be performed using any suitable number of devices in some implementations. For example, in some implementations, multiple devices can be used to implement the functions performed by device association server 102 and/or authentication server 104.

Although two user devices 108 and 110 are shown in FIG. 1, any suitable number of user devices, and/or any suitable types of user devices, can be used in some implementations.

Figure 2:
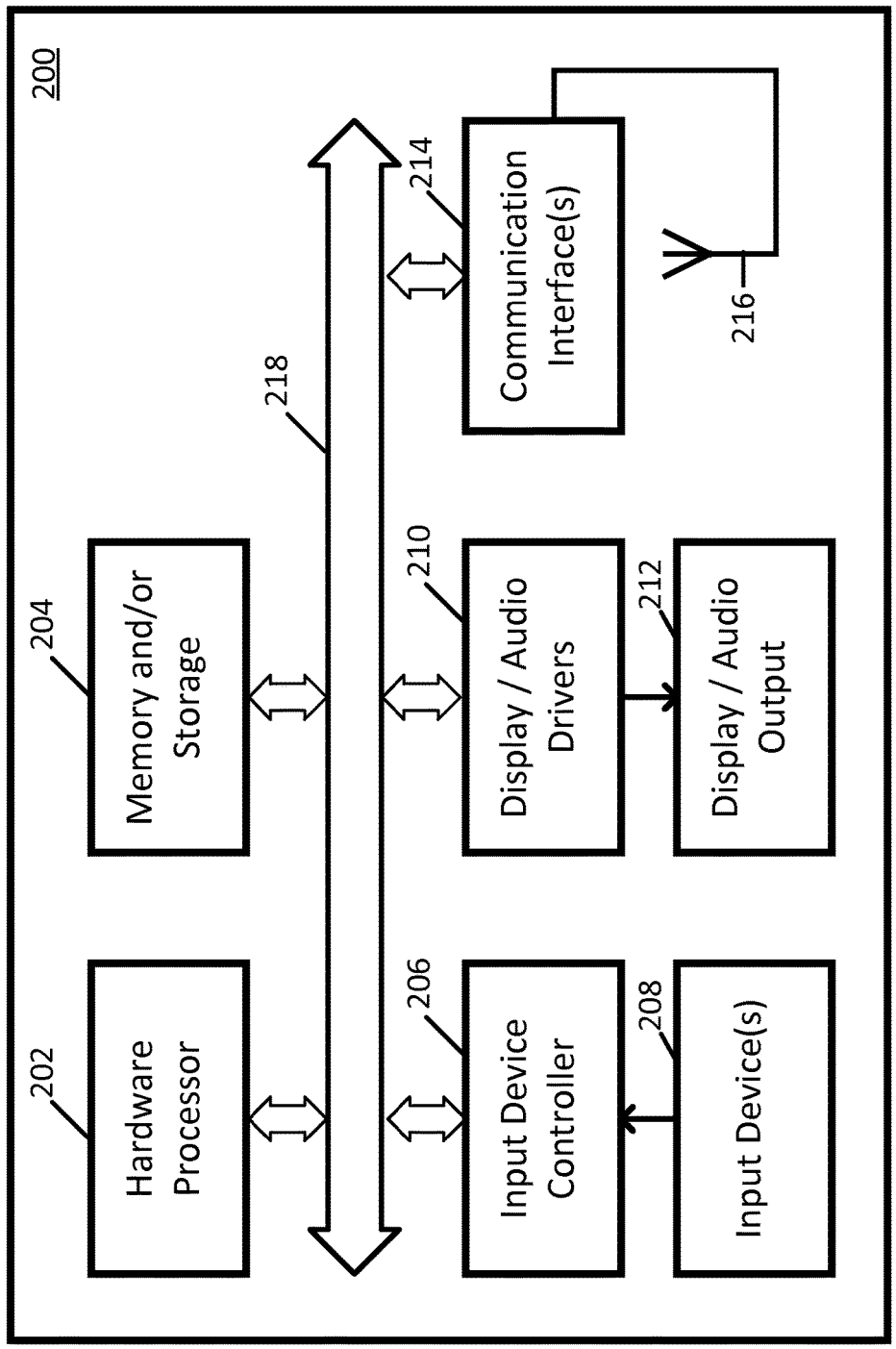
FIG. 2 shows a detailed example of hardware that can be used in a server and/or a user device of FIG. 1 in accordance with some implementations of the disclosed subject matter.

Device association server 102, authentication server 104, and user devices 108 and 110 can be implemented using any suitable hardware in some implementations. For example, in some implementations, devices 102, 104, 108, and 110 can be implemented using any suitable general purpose computer or special purpose computer. For example, authentication server 104 may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some implementations. In some implementations, hardware processor 202 can be controlled by a server program stored in memory and/or storage 204 of a server (e.g., such as device association server 102 and/or authentication server 104). For example, in some implementations, the server program can cause hardware processor 202 on authentication server 104 to generate and transmit authentication data corresponding to an existing session associated with a user account and first user device 108 to second user device 110, as described below in connection with FIG. 3.

In some implementations, hardware processor 202 can be controlled by a computer program stored in memory and/or storage 204 of first user device 108. For example, the computer program can cause hardware processor 202 to present user interfaces initiating authentication of second user device 110 and/or requesting authorization to authenticate second user device 110, cause authentication data to be transmitted to second user device 110, and/or perform any other suitable functions.

In some implementations, hardware processor 202 can be controlled by a computer program stored in memory and/or storage 204 of second user device 110. For example, the computer program can cause hardware processor 202 to transmit a status indicating a user account is to be logged in to on second user device 110 and/or perform any other suitable functions.

Memory and/or storage 204 can be any suitable memory and/or storage for storing programs, data, media content, and/or any other suitable information in some implementations. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some implementations. For example, input device controller 206 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output devices 212 in some implementations. For example, display/audio drivers 210 can be circuitry for driving a touchscreen, a flat-panel display, a cathode ray tube display, a projector, a speaker or speakers, and/or any other suitable display and/or presentation devices.

Communication interface(s) 214 can be any suitable circuitry for interfacing with one or more communication networks, such as network 106 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network (e.g., communication network 106) in some implementations. In some implementations, antenna 216 can be omitted.

Bus 218 can be any suitable mechanism for communicating between two or more components 202, 204, 206, 210, and 214 in some implementations.

Any other suitable components can be included in hardware 200 in accordance with some implementations.

Figure 3:
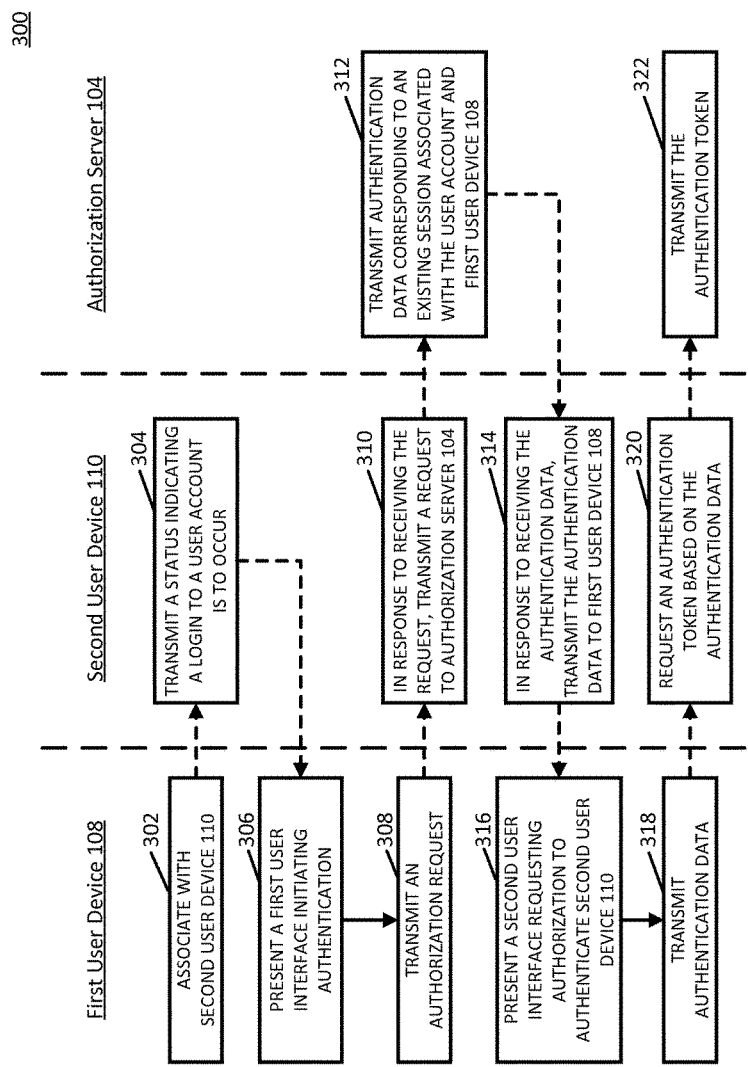
FIG. 3 shows an example of an information flow diagram for authenticating a user account on a second user device using credentials associated with the user account from a first user device in accordance with some implementations of the disclosed subject matter.

Turning to FIG. 3, an example 300 of an information flow diagram for authenticating a second user device using a first user device is shown in accordance with some implementations of the disclosed subject matter. In some implementations, portions of process 300 can be implemented on first user device 108, second user device 110, device association server 102, and/or authorization server 104.

At 302, first user device 108 can associate with second user device 110 using any suitable technique or combination of techniques. For example, in some implementations, first user device 108 and second user device 110 can each establish a connection with device association server 102 using communication network 106, and first user device 108 and second user device 110 can communicate by transmitting messages via device association server 102. In some such implementations, a connection between first user device 108 and device association server 102 can be associated with a first identifier and a connection between second user device 110 and device association server 102 can be associated with a second identifier. As another example, in some implementations, first user device 108 can associate with second user device 110 by detecting a presence of second user device 110 and forming a connection to second user device 110 (e.g., using a Discovery and Launch, or "DIAL," protocol, and/or using any other suitable techniques). Note that, in some implementations, any suitable communication channel can be established between first user device 108 and second user device 110 that allows messages to be transmitted between first user device 108 and second user device 110.

At 304, second user device 110 can transmit a message to first user device 108 indicating that a user account is to be logged in to from second user device 110. In some implementations, second user device 110 can determine that the message is to be transmitted in response to any suitable information. For example, in some implementations, second user device 110 can determine that a web page containing a user interface for logging into the user account has been navigated to. In some implementations, the message can indicate any suitable information about the user account. For example, in some implementations, the message can indicate an identifier of a service associated with the user account (e.g., a name of a video sharing service associated with the user account, a name of a social networking site associated with the user account, and/or any other suitable identifier(s)). Additionally or alternatively, in some implementations, first user device 108 can transmit a message to second user device 110 indicating that the user account is to be logged in to from second user device 110. For example, in some implementations, first user device 108 can transmit the message to second user device 110 in response to receiving an indication from a user that the user account is to be logged in to from second user device 110.

Note that, in some implementations, first user device 108 can initiate authentication of a user account on second user device 110 using user credentials user on first user device 108 in response to determining that second user device 110 is a particular type of user device (e.g., a television, a game console, a set-top box, a printer, and/or any other suitable type of device). As a more particular example, in some implementations, first user device 108 can determine a device type associated with second user device 110, and can identify one or more user accounts that have been logged in to with first user device 108 that are suitable user accounts to be logged in to from second user device 110 based on the determined device type of second user device 110. As a specific example, in an instance where first user device 108 determines that second user device 110 is a television, first user device 108 can determine that a user account associated with a video sharing service is a candidate user account to be logged in to on second user device 110 using user credentials associated with first user device 108.

In some implementations, a device type and/or a device category (e.g., television, game console, set-top box, video camera, printer, and/or any other suitable device type) can be determined using any suitable technique(s). For example, in some implementations, first user device 108 can detect the presence of one or more devices, such as a television device, for authenticating with a user account logged in on first user device 108. For example, device discovery of a nearby device can be initiated on the local area network to which first user device 108 is connected. It should be noted that device discovery can be initiated by first user device 108 at any suitable time and for any suitable reason or reasons. For example, an application executing on the first user device 108 can initiate device discovery to determine whether first user device 108 is on the same network as second user device 110 (e.g., a television device). In a more particular implementation, first user device 108 can execute a full discovery protocol on the network for determining the details of any devices found on the current network. The full discovery protocol can include transmitting a multicast message to all devices on the network requesting device details from the devices on the network. Additionally, the multicast message can be addressed to certain types of devices. In some implementations, first user device 108 can wait a predetermined amount of time for responses to the multicast message. Additionally, in some implementations, the full discovery protocol can include requesting additional device details from devices that responded by sending a message to an address and/or location included in a reply by the device to the multicast message. Such additional details can include a name of the device, a manufacturer of the device, a model name of the device, a model number of the device, a model description of the device, a serial number of the device, and/or any other suitable device information associated with the device. In some implementations, a device type or device category (e.g., television, game console, set-top box, etc.) and/or description of the device's capabilities can be included in the response to the message.

Figure 5A:
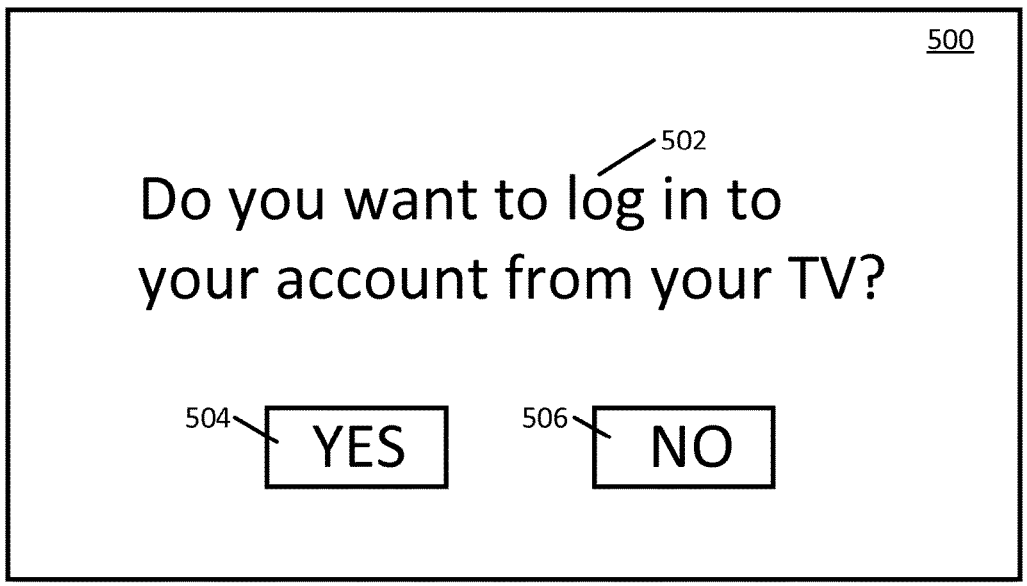
FIGS. 5A and 5B show examples of user interfaces for requesting permission to authenticate a user device in accordance with some implementations of the disclosed subject matter.

At 306, first user device 108 can present a first user interface that requests approval to initiate authentication of second user device 110. FIG. 5A shows an example 500 of the first user interface in accordance with some implementations of the disclosed subject matter. As illustrated, user interface 500 can include text 502, and selectable inputs 504 and 506. In some implementations, text 502 can include text requesting permission to begin an authentication process, as shown in FIG. 5A. In some implementations, selectable inputs 504 and 506 can correspond to "yes" and "no," respectively. In some such implementations, selection of selectable input 504 ("yes") can cause information flow 300 to continue, and selection of selectable input 508 ("no") can cause information flow 300 to terminate at block 306. Although not shown in FIG. 5A, in some implementations, user interface 500 can additionally indicate an identity of the service associated with the user account (e.g., by indicating a name of a video hosting or sharing service, a name of a social networking site, and/or any other suitable identity).

At 308, first user device 108 can transmit an authorization request to second user device 110 in response to determining that authentication of second user device 110 is to occur. The authorization request can contain any suitable information, as described below in connection with FIG. 4.

At 310, second user device 110 can transmit a request to authorization server 104 in response to receiving the authorization request from first user device 108. In some implementations, the request can include any suitable information. For example, in some implementations, the request can indicate any suitable identifying information related to first user device 108. As a more particular example, in some implementations, the identifying information can indicate information related to a connection of first user device 108 to device association server 102 (e.g., an identifier associated with first user device 108, and/or any other suitable information), information related to a configuration of first user device 108 (e.g., a manufacturer and/or model associated with first user device 108, an operating system associated with first user device 108, and/or any other suitable configuration information), information related to a user of first user device 108 (e.g., one or more usernames associated with first user device 108, and/or any other suitable information), and/or any other suitable identifying information. As another example, in some implementations, the request can indicate an identifier associated with the particular user account that is to be logged in to. As a more particular example, the request can indicate an identity of a service associated with the user account (e.g., a name of a social networking site, a name of a video sharing site, and/or any other suitable identity). As yet another example, the request can indicate any suitable information associated with second user device 110, such as an Internet Protocol (IP) address associated with second user device 110, a location of second user device 110, and/or any other suitable information.

At 312, authorization server 104 can transmit a message including authentication data to second user device 110 that corresponds to an existing session associated with the user account and associated with first user device 108. In some implementations, the authentication data can include any suitable information. For example, in some implementations, the authentication data can include a random sequence of characters (e.g., letters, numbers, any/or any other suitable characters or combination of characters) of any suitable length (e.g., four characters, eight characters, sixteen characters, and/or any other suitable length). As another example, in some implementations, the authentication data can include an encrypted token associated with a current session of the user account established by first user device 108.

In some implementations, authorization server 104 can transmit the authentication data in connection with a Uniform Resource Locator (URL) that identifies a page that can be used to sign in to the user account. For example, in some implementations, the authentication data can be embedded within a query string of the URL. As another example, in some implementations, the URL can be included in the message transmitted to second user device 110 at block 312.

Additionally or alternatively, in some implementations, the authentication data can indicate any suitable identifying information corresponding to first user device 108 and/or the user account. For example, in some implementations, the authentication data can indicate information about first user device 108 (e.g., an identifier of a user associated with first user device 108, an identifier of a manufacturer of first user device 108, an identifier of a product number associated with first user device 106, and/or any other suitable information). As another example, in some implementations, the authentication data can indicate information associated with the user account (e.g., a date and/or time the user account was last accessed from first user device 108, a Media Access Control (MAC) address associated with a connection last used to access the user account from first user device 108, and/or any other suitable information). In some implementations, the authentication data can be encrypted using any suitable protocol(s).

Note that, in some implementations, in instances where authorization server 104 is unable to identify a session established by first user device 108 that is associated with the user account, authorization server 104 can transmit a message to second user device 110 indicating that the session could not be identified. In such implementations, second user device 110 can transmit the message to first user device 108, and, in response to receiving the message, first user device 108 can establish a session associated with the user account using any suitable technique or combination of techniques. For example, in some implementations, first user device 108 can present a user interface (not shown) that requests a username and/or password to be used for logging in to the user account, and can use the entered username and/or password to log in to the user account. In some implementations, in response to determining that the session associated with the user account has been established by first user device 108, authorization server 104 can transmit a message to second user device including authentication data associated with the established session, as described above in connection with block 312.

At 314, second user device 110 can transmit the authentication data included in the received message to first user device 108. In some implementations, second user device 110 can perform any suitable processing on the received message to extract the authentication data prior to transmitting the authentication data to first user device 108. For example, in some implementations, second user device 110 can extract a particular portion of the received message that contains the authentication data. As a more particular example, in instances where the received message includes a URL and the authentication data, second user device 110 can extract the authentication data from the URL.

Figure 5B:
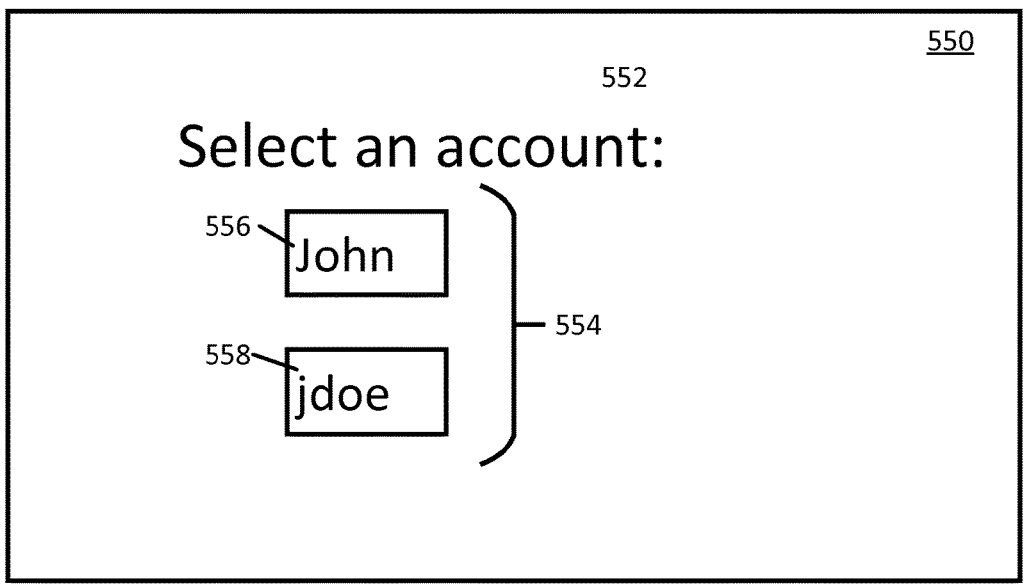

In response to receiving the authentication data, first user device 108 can present a second user interface requesting authorization to authenticate second user device 110 at 316. In some implementations, first user device 108 can identify one or more user accounts that can be used by second user device 110. In some such implementations, the second user interface can further request that a user select a particular user account to be used by second user device 110. FIG. 5B shows an example 550 of the second user interface in accordance with some implementations of the disclosed subject matter. As illustrated, user interface 550 can include text 552 and collection of user accounts 554. In some implementations, collection of user accounts 554 can include indications of one or more identified user accounts, such as identifiers 556 and 558. In some implementations, identifiers 556 and/or 558 can be selectable inputs, selection of which can indicate which user account is to be used by second user device 110. Note that although indications of two user accounts are included in collection of user accounts 554, in some implementations, any suitable number (e.g., one, two, four, and/or any other suitable number) of user accounts can be included. Additionally or alternatively, in some implementations, any other suitable text, images, icons, graphics, and/or any other suitable content can be included in user interface 550.

At 318, first user device 108 can transmit information associated with the user account to second user device 110 in response to determining that second user device 110 is to be authenticated. In some implementations, the transmitted information can indicate that second user device 110 is permitted to access the user account using login information associated with first user device 108. In such implementations, the transmitted information can include an indicator (e.g., a Boolean, an integer, a flag, and/or any other suitable type of indicator) whose value indicates that permission has been granted to access the user account. In some implementations, the transmitted information can include any other suitable information, such as an indication of which of multiple user accounts is to be used by second user device 110.

At 320, second user device 110 can request an authentication token from authorization server 104 based on the received information. In some implementations, second user device 110 can log in to the user account, for example, using the URL received from authorization server 104 at block 314. In some implementations, second user device 110 can then request the authentication token in response to determining that the user account has been successfully logged in to. Alternatively, in some implementations, second user device 110 can transmit the received information to authorization server 104 (e.g., transmit an indication that first user device 108 has granted permission for second user device 110 to log in to the user account using credentials associated with first user device 108), and can request that authorization server 104 establish a session associated with second user device 110 and the user account and transmit the authorization token in response to establishing the session.

At 322, authorization server 104 can transmit the authentication token to second user device 110. In some implementations, the authentication token can be used for any suitable purposes. For example, in some implementations, the authentication token can be used to indicate that the user account has been signed in to by second user device 110, thereby allowing the user account to remain signed in to on the second user device in instances where a particular browser window is closed.

Figure 4:
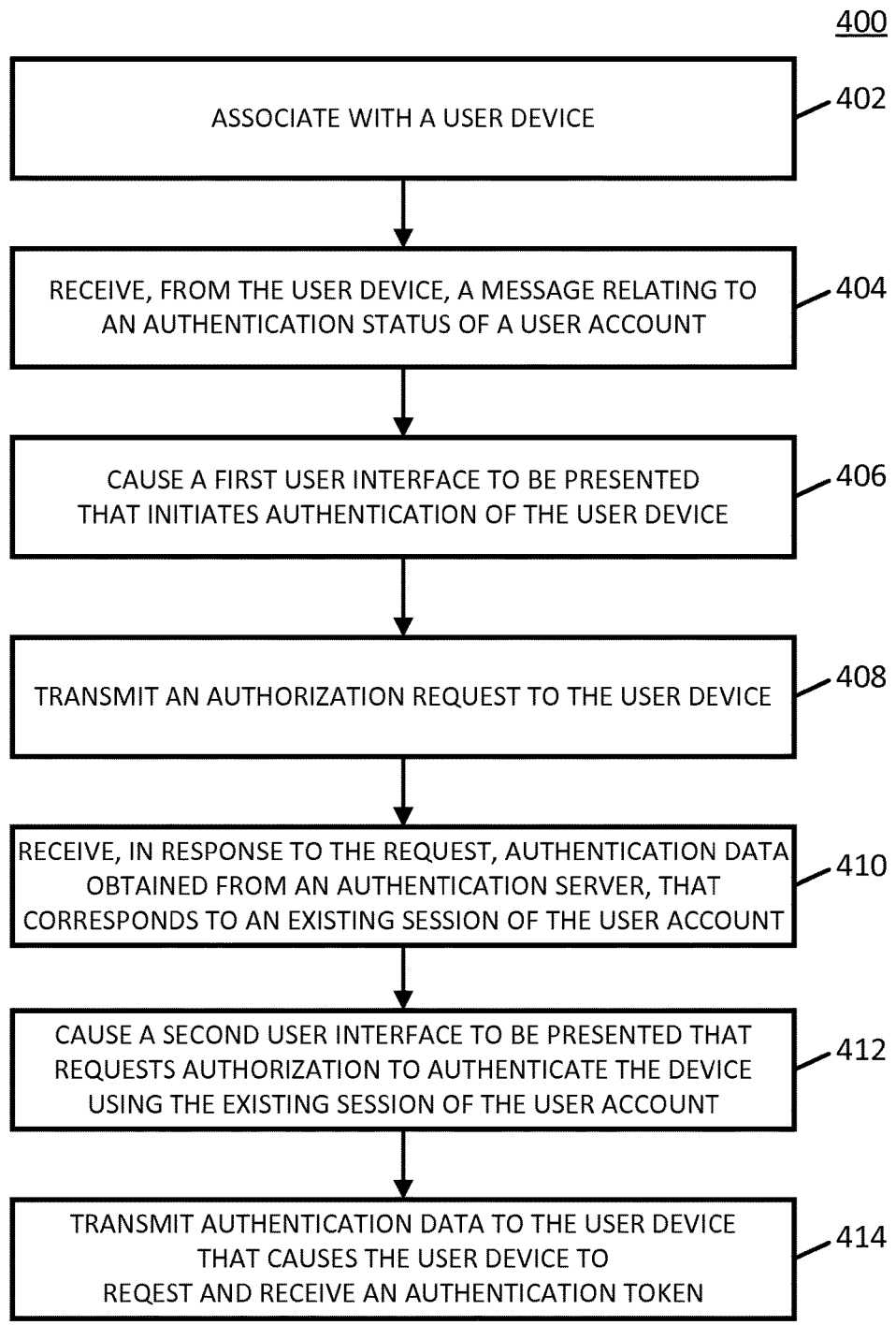
FIG. 4 shows an example of a process for authenticating a user account on a second user device using credentials associated with the user account from a first user device in accordance with some implementations of the disclosed subject matter.

Turning to FIG. 4, an example 400 of a process for causing a user account to be logged in to by a second user device using user credentials associated with a first user device is shown in accordance with some implementations of the disclosed subject matter. In some implementations, portions of process 400 can be executed by first user device 108.

Process 400 can begin by associating with a user device at 402. As described above, process 400 can associate with the user device using any suitable technique or combination of techniques. For example, in some implementations, process 400 can connect to device association server 102 via communication network 106 and can transmit and/or receive messages from the user device via device association server 102, as described above in connection with FIG. 3. As another example, in some implementations, process 400 can detect that the user device is within a predetermined proximity, and can establish a connection to the detected user device.

Process 400 can receive, from the associated user device, a message relating to an authentication status of a user account at 404. As described above, the received message can include any suitable information, such as an identifier indicating a user account that is to be accessed from the user device, an indication of a web site and/or service associated with the user account, and/or any other suitable information.

Process 400 can cause a first user interface (e.g., as shown in FIG. 5A) to be presented at 406 that requests authorization to authenticate the user device. As described above in connection with block 306 of FIG. 3, the first user interface can contain any suitable content and can request any suitable information. For example, in some implementations, the first user interface can include text requesting confirmation that the user account is to be logged in to from the user device. As a more particular example, in some implementations, the first user input can include a selectable input that, when selected, indicates permission to authenticate the user account on the user device.

Process 400 can transmit an authentication request to the user device at 408 based on the information received from the presentation of the first user interface. For example, in some implementations, process 400 can transmit an indication that permission to log in to the user account from the user device has been received. As described above in connection with FIG. 3, in some implementations, the indication can include a value (e.g., a Boolean, a flag, and/or any other suitable value) that is transmitted to the user device.

As described above in connection with blocks 310 and 312 of FIG. 3, in some implementations, the user device can transmit authentication information to authorization server 104 and can receive authentication data that corresponds to an existing session associated with the user account in response to the transmitted information. The user device can then transmit the authentication data to process 400, as described above in connection with block 314 of FIG. 3.

Process 400 can receive the authentication data that corresponds to an existing session associated with the user account at 410. As described above in connection with FIG.

3, in some implementations, the authentication data can include any suitable information. For example, in some implementations, the authentication data can include a random sequence of characters of any suitable length. As another example, in some implementations, the authentication data can include identifying information associated with a user device executing process 400. As yet another example, in some implementations, the authentication data can include identifying information associated with the user account and/or a service associated with the user account. In some implementations, process 400 can verify the received authentication data using any suitable technique or combination of techniques. For example, in some implementations, in instances where the authentication data includes identifying information associated with a user device executing process 400, process 400 can verify that the received information corresponds to the user device executing process 400. In some implementations, process 400 can perform any suitable decryption after receiving the authentication data.

Process 400 can cause a second user interface (e.g., as shown in FIG. 5B) to be presented that requests authorization to authenticate the user device using the existing session associated with the user account at 412. In some implementations, the second user interface can include any suitable content. For example, in some implementations, the second user interface can indicate one or more identified user accounts (e.g., by indicating a username associated with the user account and the existing session), as described above in connection with block 316 of FIG. 3. As another example, in some implementations, the second user interface can include a selectable input that, when selected, indicates that a particular user account is to be logged in to from the user device.

Process 400 can transmit an indication to the user device that permission has been granted for the user device to log in to the user account using information associated with the existing session at 414. In some implementations, the transmitted indication can include any suitable information. For example, in some implementations, the transmitted indication can include a value whose state indicates that permission has been granted. As another example, in some implementations, the transmitted indication can include a username associated with a particular user account that is to be used by the user device. In such implementations, the username and/or any other suitable information can be encrypted using any suitable protocol(s).

As described above in connection with blocks 320 and 322 of FIG. 3, in some implementations, the user account can then be authenticated on the user device.

In some implementations, at least some of the above described blocks of the processes of FIGS. 3 and 4 can be executed or performed in any order or sequence not limited to the order and sequence shown in and described in connection with the figures. Also, some of the above blocks of FIGS. 3 and 4 can be executed or performed substantially simultaneously where appropriate or in parallel to reduce latency and processing times. Additionally or alternatively, some of the above described blocks of the processes of FIGS. 3 and 4 can be omitted.

In some implementations, any suitable computer readable media can be used for storing instructions for performing the functions and/or processes herein. For example, in some implementations, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, systems, methods, and media for authenticating multiple devices are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A system for authentication, the system comprising: a hardware processor on a mobile device authorized to access a media service using a user account, wherein the hardware processor is programmed to: associate with a display device that is to be authenticated with a user account on the media service using the mobile device, wherein the mobile device is also associated with the user account; receive, from the media service through the display device, a status message indicating an authentication status of the user account associated with the display device; receive, from the media service through the display device, a request for permission to authenticate the user account on the display device; in response to receiving the request, cause a first interface to be presented on the mobile device that requests permission from a user of the mobile device to initiate authentication of the display device to the user account; transmit, to the media service through the display device, a response granting permission to authenticate the user account in response to receiving permission to initiate authentication of the display device to the user account using the first interface; receive, from the media service through the display device, a response to the authentication request that includes authentication data relating to a session corresponding to the user account on the media service, wherein the authentication data is generated by the media service in response to identifying the session corresponding to the user account, and wherein the authentication data includes an identifier of the session corresponding to the user account; receive, from the media service through the display device, a request for permission to authorize the display device to authenticate the identified user account and to subsequently access the media service; cause a second interface to be presented on the mobile device that requests authorization to authenticate with the media service using the identified user account; and transmit the authentication data to the display device that causes the display device to retrieve a corresponding authentication token from the media service, wherein the corresponding authentication token authenticates the user account on the display device and grants the display device access to the media service.

2. The system of claim 1, wherein the display device is a television.

3. The system of claim 1, wherein the hardware processor is further programmed to: identify a plurality of user accounts available for authentication on the display device; and request a selection of one of the plurality of user accounts to be used for authentication on the display device.

4. The system of claim 3, wherein the second interface indicates the plurality of user accounts available for authentication on the display device, and wherein the second interface requests the selection of one of the plurality of user accounts to be used for authentication on the display device.

5. The system of claim 3, wherein the hardware processor is further programmed to transmit information that identifies the one of the plurality of user accounts to be used for authentication on the display device.

6. The system of claim 1, wherein the hardware processor is further programmed to: receive, from the display device, a second response to the authentication request that indicates that a session associated with the user account was not identified by the media service; in response to receiving the second response, cause a third interface to be presented that requests user credentials associated with the user account; and transmit the user credentials to the media service.

7. The system of claim 1, wherein the hardware processor is further programmed to: identify a service associated with the user account based on the status message received from the display device; and cause an identification of the service to be presented in the first interface.

8. The system of claim 1, wherein the response to the authentication request further includes a Uniform Resource Locator (URL) associated with the user account.

9. A method for authentication, the method comprising: associating, using a hardware processor on a mobile device authorized to access a media service using a user account, with a display device that is to be authenticated with a user account on the media service using the mobile device, wherein the mobile device is also associated with the user account; receiving, from the media service through the display device, a status message indicating an authentication status of the user account associated with the display device; receiving, from the media service through the display device, a request for permission to authenticate the user account on the display device in response to receiving the request, causing a first interface to be presented on the mobile device that requests permission from a user of the mobile device to initiate authentication of the display device to the user account; transmitting, to the media service through the display device, a response granting permission to authenticate the user account in response to receiving permission to initiate authentication of the display device to the user account using the first interface; receiving, from the media service through the display device, a response to the authentication request that includes authentication data relating to a session corresponding to the user account on the media service, wherein the authentication data is generated by the media service in response to identifying the session corresponding to the user account, and wherein the authentication data includes an identifier of the session corresponding to the user account; receiving, from the media service through the display device, a request for permission to authorize the display device to authenticate the identified user account and to subsequently access the media service; causing a second interface to be presented on the mobile device that requests authorization to authenticate the display device with the media service using the identified user account; and transmitting the authentication data to the display device that causes the display device to retrieve a corresponding authentication token from the media service, wherein the corresponding authentication token authenticates the user account on the display device and grants the display device access to the media service.

10. The method of claim 9, wherein the display device is a television.

11. The method of claim 9, further comprising: identifying a plurality of user accounts available for authentication on; and requesting a selection of one of the plurality of user accounts to be used for authentication on the display device.

12. The method of claim 11, wherein the second interface indicates the plurality of user accounts available for authentication on the display device, and wherein the second interface requests the selection of one of the plurality of user accounts to be used for authentication on the display device.

13. The method of claim 11, further comprising transmitting information that identifies the one of the plurality of user accounts to be used for authentication on the display device.

14. The method of claim 9, further comprising: receiving, from the display device, a second response to the authentication request that indicates that a session associated with the user account was not identified by the media service; in response to receiving the second response, causing a third interface to be presented that requests user credentials associated with the user account; and transmitting the user credentials to the media service.

15. The method of claim 9, further comprising: identifying a service associated with the user account based on the status message received from the display device; and causing an identification of the service to be presented in the first interface.

16. The method of claim 9, wherein the response to the authentication request further includes a Uniform Resource Locator (URL) associated with the user account.

* * * * *